Feb. 17, 1931.  J. M. AUFIERO  1,793,041
WINDSHIELD WIPER AND MOTOR
Filed July 21, 1928  2 Sheets-Sheet 1

INVENTOR.
John M. Aufiero
BY Duell, Dunn & Anderson
ATTORNEYS.

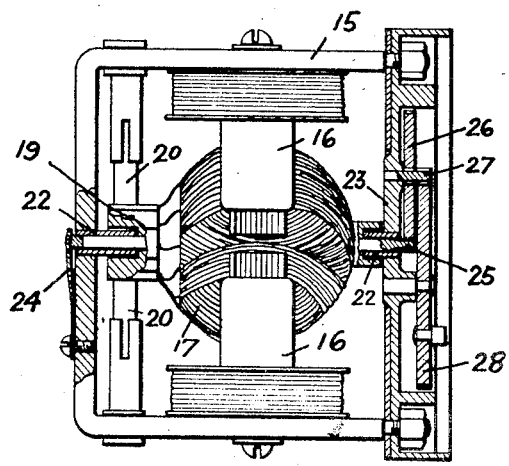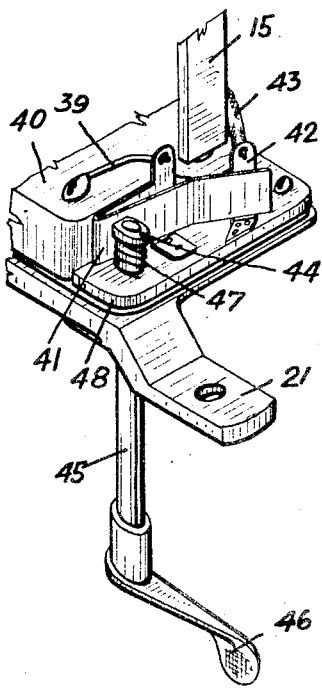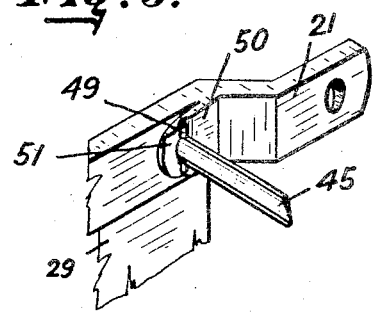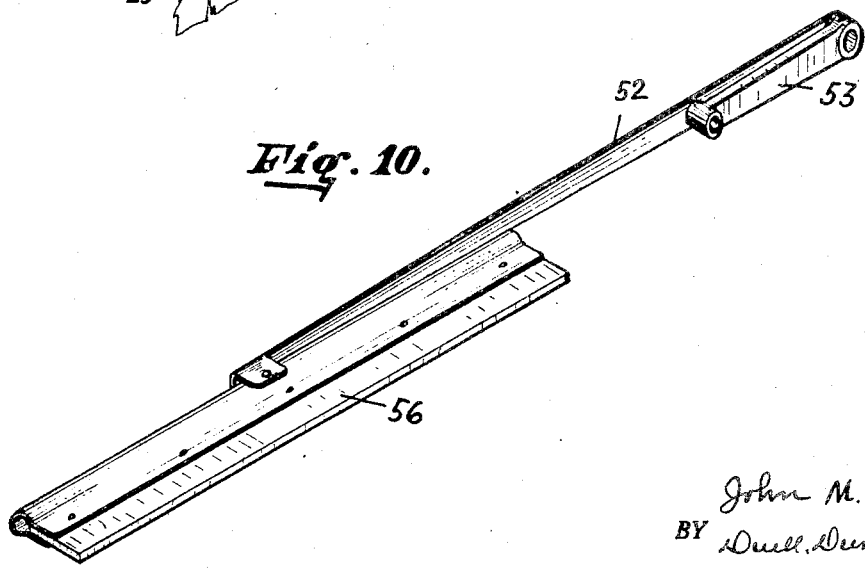

Patented Feb. 17, 1931

1,793,041

UNITED STATES PATENT OFFICE

JOHN M. AUFIERO, OF BROOKLYN, NEW YORK, ASSIGNOR TO E. A. LABORATORIES, INC., OF BROOKLYN, NEW YORK, A CORPORATION OF NEW YORK

WINDSHIELD WIPER AND MOTOR

Application filed July 21, 1928. Serial No. 294,340.

This invention relates to a structurally and functionally improved wiper mechanism capable of use in numerous different associations but primarily intended to be employed in connection with the cleaning of a motor vehicle windshield.

It is an object of the invention to provide a device of this character, the parts of which will be relatively few in number and individually simple and rugged in construction, these parts being capable of being assembled readily by unskilled workmen to provide a finished unit operating over long periods of time with freedom from mechanical difficulty.

A further object of the invention is that of constructing a wiper mechanism which will occupy a minimum amount of space and which in operation will consume a very small amount of current.

A still further object is that of furnishing a cleaner in which, in the event of current or motor failure, the wiper may be manually operated without difficulty and furthermore without injury to the mechanism.

Another object is that of furnishing a wiper mechanism in which the blade or squeegee when not in use will be subjected to no wear or distorting influence and which, furthermore, will automatically remain out of the range of vision of the operator.

With these and additional objects in mind, reference is had to the attached sheets of drawings illustrating one practical embodiment of the invention and in which:

Fig. 7 is a sectional plan view of the motor and gearing;

Fig. 8 is a perspective view of the switch mechanism;

Fig. 9 is a similar view showing the switch actuating arm; and

Fig. 10 is a perspective of the wiper arm showing a blade in association therewith.

Figure 1:
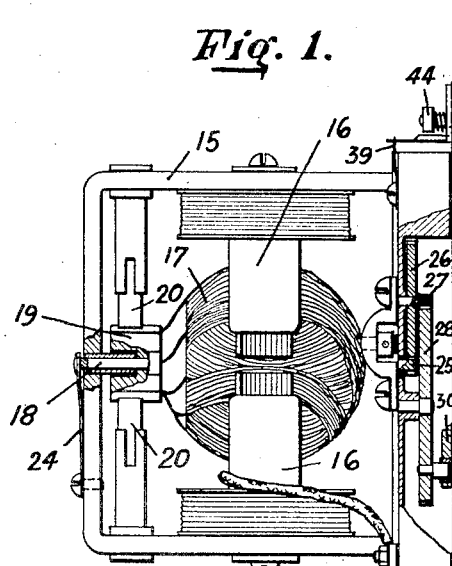
Fig. 1 is a sectional plan view of a wiper mechanism.

The illustrated embodiment of the invention shows a wiper which, as aforestated, is primarily intended to be employed in connection with wiping the windshield of a motor vehicle and furthermore, in this embodiment, a mechanism has been shown in which the motor is disposed exteriorly of the windshield. At this time, it will be understood that the mechanism might readily be disposed otherwise if desired and according to the construction of the vehicle with which it is associated.

Thus in these views, the numeral 15 indicates a motor frame which carries pole pieces 16 and within the field of which an armature 17 revolves. The shaft 18 thereof mounts, in the usual manner, a commutator 19 with which brushes 20 cooperate, the latter being supported by the frame.

At this time, it will be understood that the motor is enclosed by a suitable casing (not shown) which excludes moisture and dirt, and this casing is secured to a bracket or supporting portion 21 which is attached to the exterior of the windshield.

Contrary to conventional construction and as shown in Figs. 1 and 7, portions of the armature shaft are reduced by, for example, counter-boring this shaft or the ends of the armature assembly to permit of the introduction of sleeve bearings 22 supported by the frame and base 23 of the motor. By this expedient, it will be understood that the armature is supported in a suitable antifrictional manner and that the over-all depth of the motor is reduced materially. Also the outer reduced end portion of the armature shaft may be engaged by a resilient clip member 24 mounted by the motor frame and serving to retain the armature against longitudinal movement.

The base 23 of the motor provides a casing portion housing in the embodiment illustrated a train of gears. Specifically the inner end portion of the armature shaft is formed or generated to provide a pinion 25, the teeth of which engage the teeth of a gear 26, the latter in turn being fixed to or having as an integral part a pinion 27, the teeth of which mesh with a gear 28. All of these elements are conveniently disposed within the casing portion as aforestated and it is obvious that with the face of the latter closed as, for example, by a plate 29 forming a part of the bracket 21, a space is provided which may be adequately filled with a lubricant at the time of assemblage. Furthermore, by utilizing, for example, a motor having an operating speed of 3,500 R. P. M. it is practicable to employ a motor of very small power consuming a very small amount of current, but which will rotate the gear 28 with sufficient force for all practical purposes.

Figure 2:
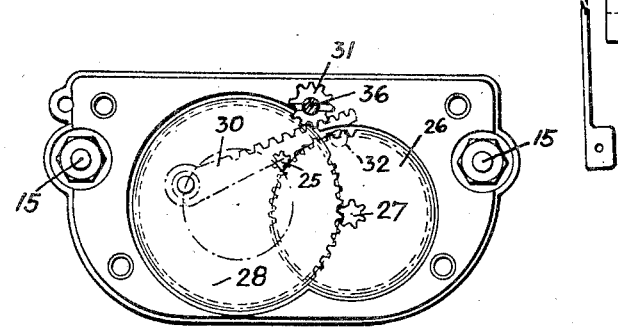
Fig. 2 is a sectional front view thereof.
Figure 6:
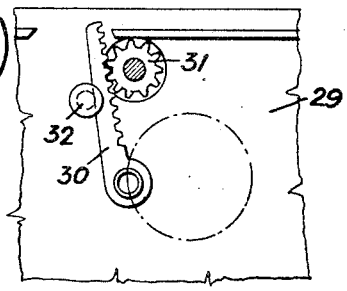
Fig. 6 is a further detail of such drive mechanism.

As shown in the figures afore referred to, as well as in Figs. 2 and 6, a pitman 30 has its inner end rockingly attached to a stud projecting from the gear and this pitman has its edge serrated to provide a rack, the teeth of which mesh with the teeth of a pinion 31, these parts being retained in operative association as, for example, by a guide element 32 carried by the plate 29 and bearing against the rear edge of the pitman.

Figure 3:
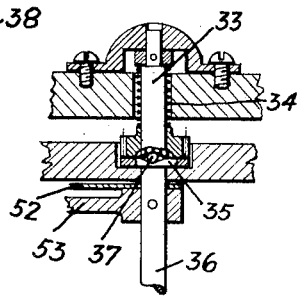
Fig. 3 is an enlarged transverse sectional view of certain of the driving parts.
Figure 5:
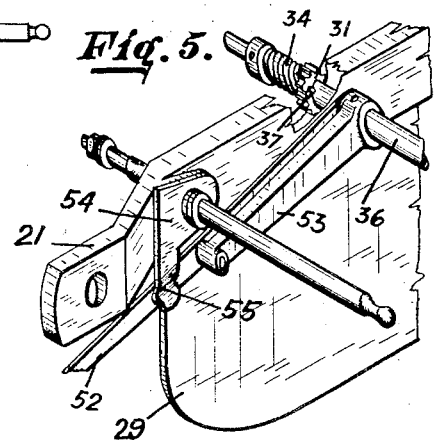
Fig. 5 is a perspective view of this structure and furthermore showing the drive mechanism illustrated in Fig. 3.
Figure 4:
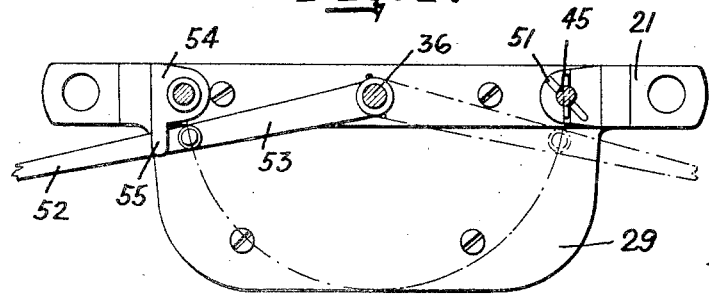
Fig. 4 is a rear view of the blade actuating arm.

It is thus obvious that as the motor rotates, the pinion 31 will be oscillated and this pinion, as shown in Figs. 3 and 5, is loosely mounted upon a shaft 33 and is engaged by a spring 34 which serves to press the pinion in such a manner that it will act as a clutch part. In this connection it will be observed that a shaft 36 is utilized which may conveniently carry a plate 35 and to which there is secured a pin 37, the plate 35 and pinion 31 having complementary grooves within which this pin may ride. Thus, normally, the pinion and the shaft 36 will move in unison but it is obvious that by simply rocking the shaft 36 as, for example, by a finger piece 38, the pinion will be forced rearwardly along the shaft 33 so that a reverse driving of the gear train and the motor will be avoided. As soon as the motor again starts, the parts will couple automatically incident to the clutch provision utilized so that no difficulty will be experienced in this connection.

With a view to avoiding undue and unnecessary illustration the wiring has not been shown in detail. Suffice it to say this wiring may be arranged in any manner best suited to the installation of the apparatus as, for example, to provide a series wound motor. In any event, however, it is preferred to employ a switch member of the type shown in Fig. 8 in which it will be observed that a lead 39 extends from a block 40 and the latter mounts a conducting spring clip 41 bent upon itself and having its free end normally spaced from a contact element 42 from which a lead 43 extends. A cam member 44 is secured to an operating shaft 45 terminating for example in a finger piece 46 and a spring 47 is secured to this cap and the base 48 through which the shaft extends in order to normally maintain the shaft in such a predetermined position that the end of the strip 41 will be spaced from the contact 42. However, by simply turning the shaft, the cam 44 will serve to swing the end of the strip into contact with the element 42 thus closing the circuit and initiating the operation of the motor. As shown in Fig. 9, the shaft 45 may carry a pin 49 which rides against a plate portion 50 having grooves 51. Incident to the fact that the spring not alone forces the shaft outwardly but due to the attachment of its ends to the base and cam serves normally to maintain the latter in inoperative position. It is apparent that as the shaft is rotated to cause the cam to assume an operative position, this spring will cause the rod to bear within the groove 51 with sufficient intimacy to prevent an accidental dislodgment thereof.

Finally, with reference to the wiper arm, it will be noted as in Fig. 10 that according to the present invention, it is preferred to utilize a metallic strip 52 which is curved transversely of its body in order to rigidify the same.

Also, with a view to strengthening this strip, an arm 53 is utilized which has its outer end secured to the strip, its inner end being formed with an opening for the accommodation of the shaft 36. Furthermore, a bracket 21 carries, as shown in Fig. 5, a clip 54 having a bulged portion 55 at its outer end which portion is complementary to the degree of curvature of the strip 52. Furthermore, it will be observed that this is disposed to swing the strip away from the face of the windshield when the strip and clip are engaged. Thus, the blade 56 secured to the outer end of the strip will, in addition to being retained out of the range of vision of the driver, when the clip and strip are engaged, be moved to a point at which the wiper blade is out of contact with the windshield so as to afford an opportunity for this element to reestablish its condition.

Thus among others, the several objects of the invention are achieved. It is intended, however, that numerous changes in construction and rearrangements of the parts might be resorted to without in the slightest departing from the spirit of the invention as defined by the claims.

Having described my invention, what I claim as new and desire to secure by Letters Patent, is:

1. A wiper mechanism including a shaft, power means for oscillating said shaft, a wiper arm connected to said shaft and being rocked thereby through a predetermined arc of movement, means beyond such arc of movement and engageable with said arm to retain the same against movement, and means acting automatically upon said arm being shifted to such latter position to uncouple the same from operative connection with said shaft.

2. A wiper mechanism including, in combination, a frame, a shaft supported by said frame, an arm connected to said shaft, power means connected to said shaft to normally oscillate said arm through a predetermined arc of movement, means carried by said frame and engageable with said arm at a point beyond its normal path of movement and to retain said arm fixed with respect to said frame, and means for uncoupling said arm from operative connection with said shaft and shifting the same to such position.

In testimony whereof I affix my signature.

JOHN M. AUFIERO.